United States Patent
Kim et al.

(10) Patent No.: US 8,761,988 B2
(45) Date of Patent: Jun. 24, 2014

(54) METHOD AND APPARATUS FOR CONTROLLING A MULTI-MODE POWERTRAIN SYSTEM

(75) Inventors: Kee Yong Kim, Ann Arbor, MI (US); Anthony H. Heap, Ann Arbor, MI (US); Samantha Victoria Lado, Pittsfield Township, MI (US); Jeffrey J. Waldner, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 23 days.

(21) Appl. No.: 13/568,061

(22) Filed: Aug. 6, 2012

(65) Prior Publication Data

US 2014/0039737 A1    Feb. 6, 2014

(51) Int. Cl.
*B60K 17/06* (2006.01)

(52) U.S. Cl.
USPC .............................. 701/25; 701/54

(58) Field of Classification Search
USPC ................................... 701/25, 54
See application file for complete search history.

(56) References Cited

U.S. PATENT DOCUMENTS

| | | |
|---|---|---|
| 7,645,206 B2 | 1/2010 | Holmes et al. |
| 2009/0118942 A1* | 5/2009 | Hsieh et al. ............... 701/54 |
| 2010/0179009 A1 | 7/2010 | Wittkopp et al. |

OTHER PUBLICATIONS

U.S. Appl. No. 13/570,175, Lado, et al.
U.S. Appl. No. 13/569,929, Diaz, et al.
U.S. Appl. No. 13/568,086, Heap, et al.
U.S. Appl. No. 13/568,070, Heap, et al.
U.S. Appl. No. 13/571,070, Heap, et al.
U.S. Appl. No. 13/568,071, Kim, et al.
U.S. Appl. No. 13/568,083, Heap, et al.

* cited by examiner

*Primary Examiner* — Mary Cheung
*Assistant Examiner* — Yuen Wong (57) ABSTRACT

A method for operating a powertrain system to transfer torque among an engine, torque machines, and a driveline includes executing a search to determine a preferred engine operating point for operating the powertrain system in a transmission range in response to an output torque request. The search includes employing a candidate torque normalization ratio to determine a candidate engine torque from a normalized torque search space, and determining a candidate power cost associated with operating the powertrain system at the candidate engine torque for each of a plurality of candidate engine speeds within an input speed range and a plurality of candidate torque normalization ratios. A preferred engine speed is determined, and includes the candidate engine speed corresponding to the one of the candidate engine torques associated with a minimum of the candidate power costs. Engine operation is controlled responsive to the preferred engine speed.

18 Claims, 4 Drawing Sheets

METHOD AND APPARATUS FOR CONTROLLING A MULTI-MODE POWERTRAIN SYSTEM

TECHNICAL FIELD

This disclosure is related to multi-mode powertrain systems employing multiple torque-generative devices, and dynamic system controls associated therewith.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

Known transmission devices employ torque-transfer clutch devices to transfer torque among the engine, the torque machines and the driveline. Operation of a powertrain system includes activating and deactivating the clutches to effect operation in selected operating states.

SUMMARY

A method for operating a powertrain system to transfer torque among an engine, torque machines, and a driveline includes executing a search to determine a preferred engine operating point for operating the powertrain system in a transmission range in response to an output torque request. The search includes employing a candidate torque normalization ratio to determine a candidate engine torque from a normalized torque search space, and determining a candidate power cost associated with operating the powertrain system at the candidate engine torque for each of a plurality of candidate engine speeds within an input speed range and a plurality of candidate torque normalization ratios. A preferred engine speed is determined, and includes the candidate engine speed corresponding to the one of the candidate engine torques associated with a minimum of the candidate power costs. Engine operation is controlled responsive to the preferred engine speed.

BRIEF DESCRIPTION OF THE DRAWINGS

One or more embodiments will now be described, by way of example, with reference to the accompanying drawings, in which:

FIG. 3-1 illustrates a torque search space associated with operating an embodiment of the multi-mode powertrain system in response to an output torque request, in accordance with the disclosure;

FIG. 3-2 illustrates a normalized torque search space including normalized engine torque plotted relative to engine speed, in accordance with the disclosure.

DETAILED DESCRIPTION

Figure 1:
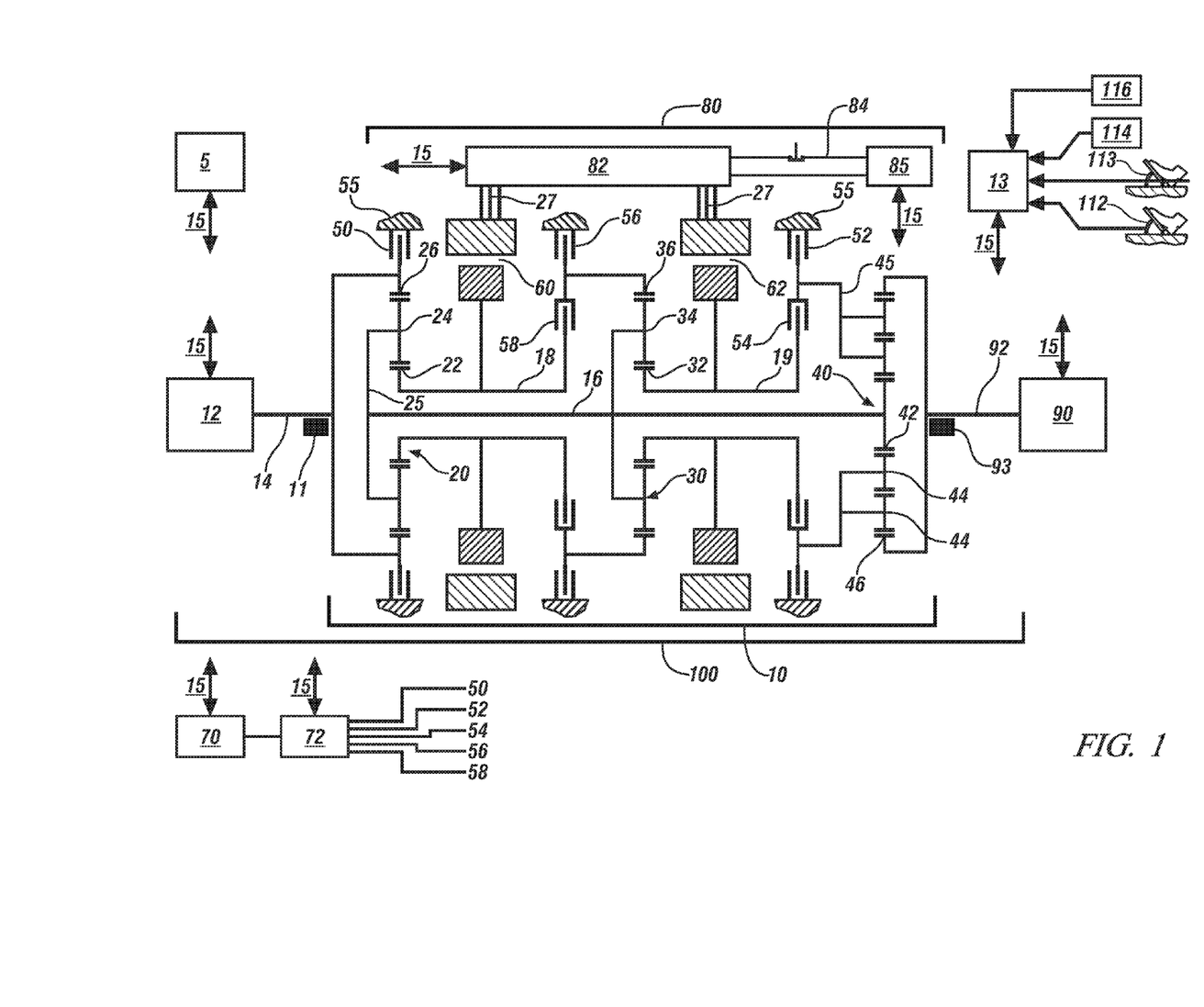
FIG. 1 illustrates a multi-mode powertrain system including an internal combustion engine, transmission, driveline, and a controller, in accordance with the disclosure.

Referring now to the drawings, wherein the showings are for the purpose of illustrating certain exemplary embodiments only and not for the purpose of limiting the same, FIG. 1 depicts a non-limiting powertrain system 100 including an internal combustion engine (engine) 12, a multi-mode transmission (transmission) 10, a high-voltage electrical system 80, a driveline 90, and a controller 5. The transmission 10 mechanically couples to the engine 12 and first and second torque machines 60 and 62, respectively, and is configured to transfer torque between the engine 12, the torque machines 60, 62, and the driveline 90. As illustrated, the first and second torque machines 60, 62 are electric motor/generators.

The high-voltage electrical system 80 includes an electrical energy storage device, e.g., a high-voltage battery (battery) 85 electrically coupled to a transmission power inverter control module (TPIM) 82 via a high-voltage electrical bus 84, and is configured with suitable devices for monitoring electric power flow including devices and systems for monitoring electric current and voltage. The battery 85 can be any suitable high-voltage electrical energy storage device, e.g., a high-voltage battery, and preferably includes a monitoring system that provides a measure of electrical power supplied to the high-voltage bus electrical 84, including voltage and electric current.

The engine 12 may be any suitable combustion device, and includes a multi-cylinder internal combustion engine selectively operative in several states to transfer torque to the transmission 10 via an input member 14, and can be either a spark-ignition or a compression-ignition engine. The engine 12 includes a crankshaft coupled to the input member 14 of the transmission 10. A rotational speed sensor 11 monitors crank angle and rotational speed of the input member 14. Power output from the engine 12, i.e., engine speed and engine torque, can differ from input speed and input torque to the transmission 10 due to placement of torque-consuming components on the input member 14 between the engine 12 and the transmission 10, e.g., a torque management device or a mechanically-powered hydraulic pump. The engine 12 is configured to execute autostop and autostart operations during ongoing powertrain operation in response to operating conditions. The controller 5 is configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque. Engine speed may also be controlled by controlling reaction torque at the input member 14 by controlling motor torques of first and second torque machines 60 and 62, respectively.

The illustrated transmission 10 is a four-mode, compound-split, electro-mechanical transmission 10 that includes three planetary-gear sets 20, 30, and 40, and five engageable torque-transferring devices, i.e., clutches C1 52, C2 54, C3 56, C4 58, and C5 50. Other embodiments of the transmission are contemplated. The transmission 10 couples to first and second torque machines 60 and 62, respectively. The transmission 10 is configured to transfer torque between the engine 12, the torque machines 60, 62, and the output member 92 in response to an output torque request. The first and second torque machines 60, 62 in one embodiment are motor/generators that employ electric energy to generate and react torque. The planetary gear set 20 includes a sun gear member 22, a ring gear member 26, and planet gears 24 coupled to a carrier member 25. The carrier member 25 rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member 35. The planet gears 34 are disposed in meshing relationship with both the sun gear member 32 and the ring gear member 36. The carrier member 35 couples to the rotatable shaft member 16. The planetary gear set 40 includes a sun gear member 42, a ring gear member 46, and planet gears 44 coupled to a carrier member 45. As shown, there are first and second sets of planet gears 44 coupled to the carrier member 45. Thus, the planetary gear set 40 is a compound, sun gear member-pinion gear-pinion gear-ring gear member gear set. The carrier member 45 rotatably couples between clutches C1 52 and C2 54. The sun gear member 42 rotatably couples to the rotatable shaft member 16. The ring gear member 46 rotatably couples to the output member 92.

As used herein, clutches refer to torque transfer devices that can be selectively applied in response to a control signal, and may be any suitable devices including by way of example single or compound plate clutches or packs, one-way clutches, band clutches, and brakes. A hydraulic circuit 72 is configured to control clutch states of each of the clutches, with pressurized hydraulic fluid supplied by an electrically-powered hydraulic pump 70 that is operatively controlled by the controller 5. Clutches C2 54 and C4 58 are hydraulically-applied rotating friction clutches. Clutches C1 52, C3 56, and C5 50 are hydraulically-controlled brake devices that can be grounded to a transmission case 55. Each of the clutches C1 52, C2 54, C3 56, and C4 58 is hydraulically applied using pressurized hydraulic fluid supplied by the hydraulic control circuit 72 in this embodiment. The hydraulic circuit 72 is operatively controlled by the controller 5 to activate and deactivate the aforementioned clutches, provide hydraulic fluid for cooling and lubricating elements of the transmission, and provide hydraulic fluid for cooling the first and second torque machines 60 and 62. Hydraulic pressure in the hydraulic circuit 72 may be determined by measurement using pressure sensor(s), by estimation using on-board routines, or using other suitable methods.

The first and second torque machines 60 and 62 are three-phase AC motor/generator machines, each including a stator, a rotor, and a resolver. The motor stator for each of the torque machines 60, 62 is grounded to an outer portion of the transmission case 55, and includes a stator core with coiled electrical windings extending therefrom. The rotor for the first torque machine 60 is supported on a hub plate gear that mechanically attaches to sleeve shaft 18 that couples to the first planetary gear set 20. The rotor for the second torque machine 62 is fixedly attached to sleeve shaft hub 19 that mechanically attaches to the second planetary gear 30. Each of the resolvers is signally and operatively connected to the transmission power inverter control module (TPIM) 82, and each senses and monitors rotational position of the resolver rotor relative to the resolver stator, thus monitoring rotational position of respective ones of first and second torque machines 60 and 62. Additionally, the signals output from the resolvers may be used to determine rotational speeds for first and second torque machines 60 and 62.

The output member 92 of the transmission 10 is rotatably connected to the driveline 90 to provide output power to the driveline 90 that is transferred to one or a plurality of vehicle wheels via differential gearing or a transaxle or another suitable device. The output power at the output member 92 is characterized in terms of an output rotational speed and an output torque. A transmission output speed sensor 93 monitors rotational speed and rotational direction of the output member 92. Each of the vehicle wheels is preferably equipped with a sensor configured to monitor wheel speed to determine vehicle speed, and absolute and relative wheel speeds for braking control, traction control, and vehicle acceleration management.

The input torque from the engine 12 and the motor torques from the first and second torque machines 60 and 62 are generated as a result of energy conversion from fuel or electrical potential stored in the electrical energy storage device (battery) 85. The battery 85 is high voltage DC-coupled to the TPIM 82 via the high-voltage electrical bus 84 that preferably include a contactor switch that permits or prohibits flow of electric current between the battery 85 and the TPIM 82. The TPIM 82 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the battery 85 to AC power for powering respective ones of the first and second torque machines 60 and 62, by switching at high frequencies. The insulated gate bipolar transistors form a switch mode power supply configured to receive control commands. There is a pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 60 and 62 for operation as motors or generators via transfer conductors. The TPIM 82 transfers electrical power to and from the first and second torque machines 60 and 62 through the power inverters and respective motor control modules in response to the motor torque commands. Electrical current is transmitted across the high-voltage electrical bus 84 to and from the battery 85 to charge and discharge the battery 85.

The controller 5 signally and operatively links to various actuators and sensors in the powertrain system via a communications link 15 to monitor and control operation of the powertrain system, including synthesizing information and inputs, and executing routines to control actuators to meet control objectives related to fuel economy, emissions, performance, drivability, and protection of hardware, including batteries of battery 85 and the first and second torque machines 60 and 62. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the TPIM 82. A user interface 13 is preferably signally connected to a plurality of devices through which a vehicle operator directs and commands operation of the powertrain system. The devices preferably include an accelerator pedal 112, an operator brake pedal 113, a transmission range selector 114 (PRNDL), and a vehicle speed cruise control system 116. The transmission range selector 114 may have a discrete number of operator-selectable positions, including indicating direction of operator-intended motion of the vehicle, and thus indicating the preferred rotational direction of the output member 92 of either a forward or a reverse direction. It is appreciated that the vehicle may still move in a direction other than the indicated direction of operator-intended motion due to rollback caused by location of a vehicle, e.g., on a hill. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The powertrain 100 is configured to operate in one of a plurality of powertrain states, including a plurality of transmission ranges and engine states to generate and transfer torque to the driveline 90. The engine states include an ON state, an OFF state, and a fuel cutoff (FCO) state. When the engine operates in the OFF state, it is unfueled, not firing, and is not spinning. When the engine operates in the ON state it is fueled, firing, and spinning When the engine operates in the FCO state, it is spinning but is unfueled and not firing. The engine ON state may further include an all-cylinder state (ALL) wherein all cylinders are fueled and firing, and a cylinder-deactivation state (DEAC) wherein a portion of the cylinders are fueled and firing and the remaining cylinders are unfueled and not firing. The transmission ranges include a plurality of neutral (neutral), fixed gear (Gear #), variable mode (EVT Mode #), electric vehicle (EV#) and transitional (EV Transitional State# and Pseudo-gear #) ranges that are achieved by selectively activating the clutches C1 50, C2 52, C3 54, C4 56, and C5 58. A pseudo-gear range is a variable mode transmission range in which torque output from the transmission 10 corresponds to the input torque from the engine 12, taking into account torque losses associated with torque-consuming components on the input member 14. The pseudo-gear ranges are primarily employed as intermediate transmission ranges during shifts between EVT Mode ranges. Table 1 depicts a plurality of transmission ranges and engine states for operating the powertrain 100.

TABLE 1

| Range | Engine State | C1 | C2 | C3 | C4 | C5 |
|---|---|---|---|---|---|---|
| Neutral 1 | ON(ALL/DEAC/FCO)/OFF | | | | | |
| Neutral 2 | ON(ALL/DEAC/FCO)/OFF | | x | | | |
| Neutral 3 | ON(ALL/DEAC/FCO)/OFF | | | | x | |
| PseudoGear 1 | ON(ALL/DEAC/FCO)/OFF | x | | | | |
| PseudoGear 2 | ON(ALL/DEAC/FCO)/OFF | | x | | | |
| Neutral | OFF | | | | | x |
| EVT Mode 1 | ON(ALL/DEAC/FCO)/OFF | x | | x | | |
| EVT Mode 2 | ON(ALL/DEAC/FCO)/OFF | x | | | x | |
| EVT Mode 3 | ON(ALL/DEAC/FCO)/OFF | | | x | x | |
| EVT Mode 4 | ON(ALL/DEAC/FCO)/OFF | | | x | x | |
| EV Transitional State 1 | OFF | x | | | | x |
| EV Transitional State 2 | OFF | | | x | | x |
| Gear 1 | ON(ALL/DEAC/FCO) | x | | | x | x |
| Gear 2 | ON(ALL/DEAC/FCO) | x | x | | x | |
| Gear 3 | ON(ALL/DEAC/FCO) | | | x | x | x |
| EV1 | OFF | x | | | x | x |
| EV2 | OFF | x | | | x | x |
| EV3 | OFF | | | x | | x |
| EV4 | OFF | | | x | x | x |
| EV Transitional State 3 | OFF | x | x | | | x |
| Neutral | ON(ALL/DEAC/FCO)/OFF | | | | x | x |
| PseudoGear 3 | ON(ALL/DEAC/FCO)/OFF | x | x | | | |
| Neutral | OFF | | | x | | x |
| Neutral | OFF | | | | x | x |

A method for operating the powertrain system described with reference to FIG. 1 to transfer torque between the engine, torque machines, and the driveline includes executing a search to determine a preferred engine operating point for operating the powertrain system in one of the transmission ranges in response to an output torque request. The search includes employing a candidate torque normalization ratio to determine a candidate engine torque from a normalized torque search space, and determining a candidate power cost associated with operating the powertrain system at the candidate engine torque. The search is executed for each of a plurality of candidate engine speeds within an input speed range and a plurality of candidate torque normalization ratios. A preferred engine speed is determined, and includes the candidate engine speed corresponding to the one of the candidate engine torques associated with a minimum of the candidate power costs. Engine operation is controlled responsive to the preferred engine speed. Such operation is described with reference to FIG. 2.

Figure 2:
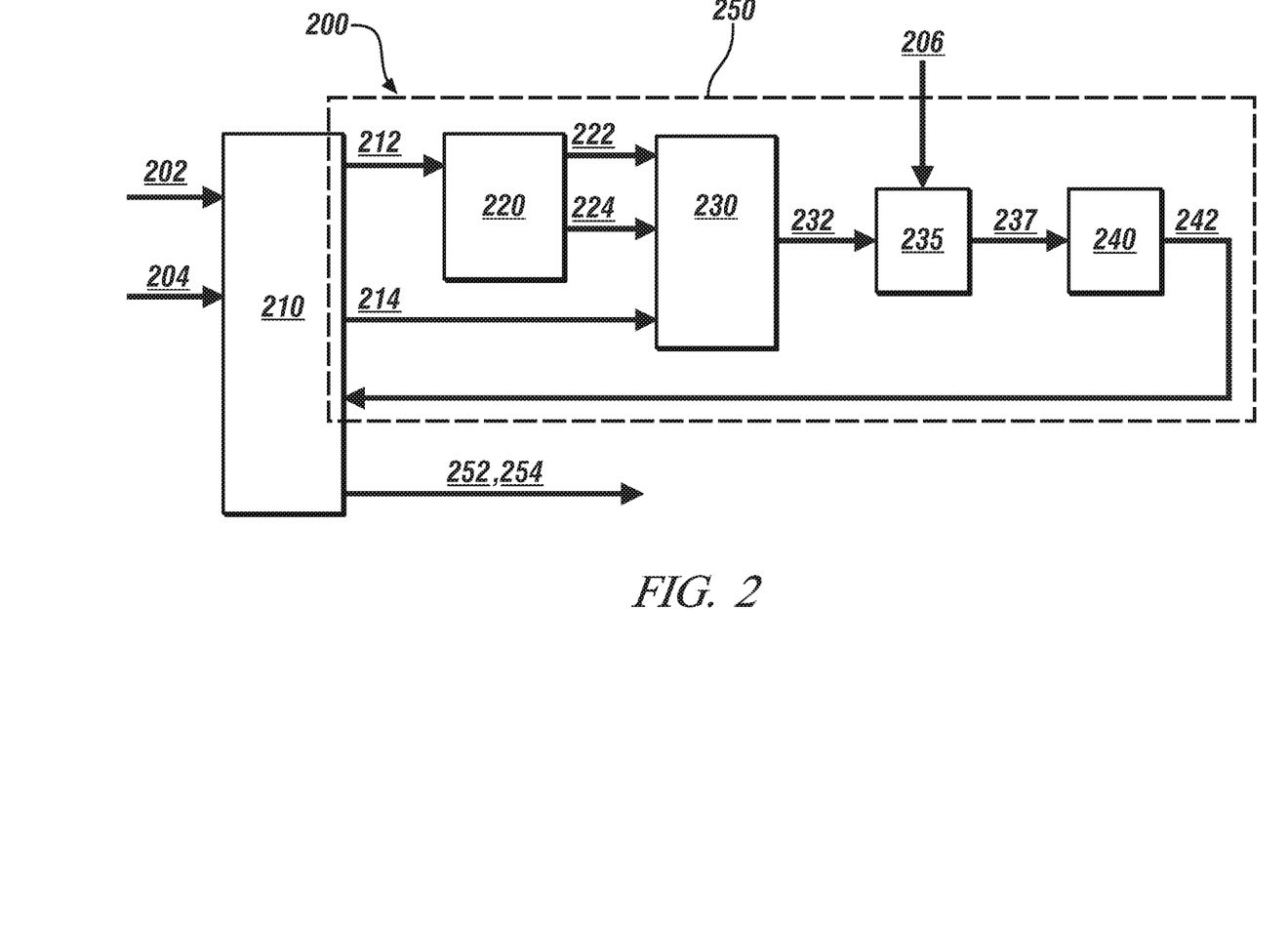
FIG. 2 illustrates a search scheme that employs a torque search space to converge to a preferred engine speed and a preferred engine load, in accordance with the disclosure.
Figure 31:
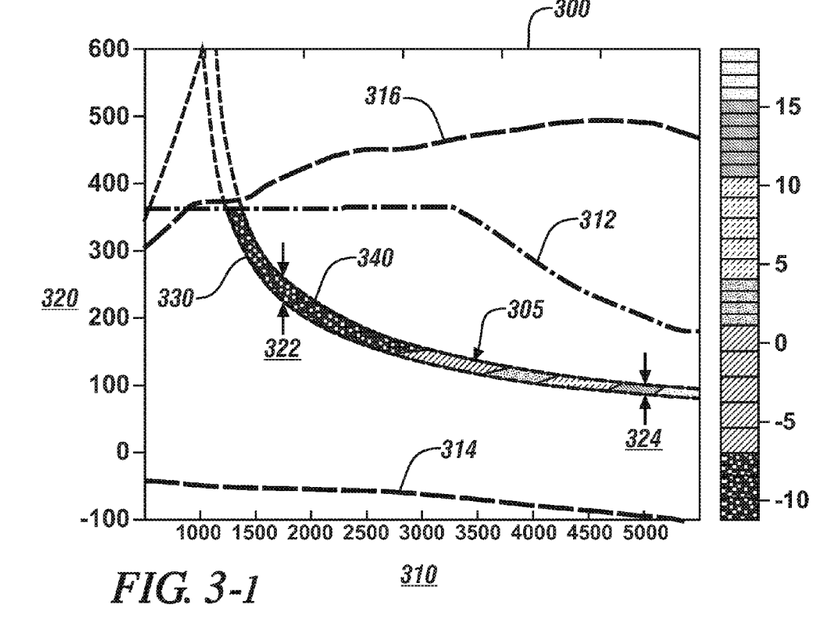
Figure 32:
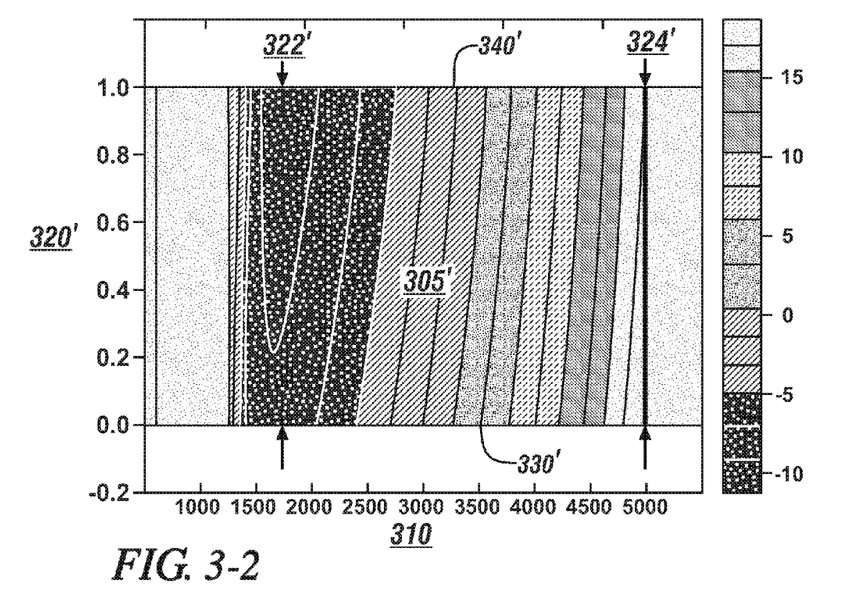

FIG. 2 schematically shows a search scheme 200 that employs a search engine to converge from a predetermined torque search space to a preferred engine speed Ne* 252 and a corresponding power cost P* 254. FIG. 3-1 graphically depicts an exemplary torque search space 305 showing minimum and maximum engine torque limits 330 and 340 over an input speed range. FIG. 3-2 graphically depicts an exemplary normalized torque search space 305' showing minimum and maximum normalized engine torque limits 330' and 340' over the same input speed range. The search scheme 200 employs an input speed range 202 and a torque normalization ratio range 204. The input speed range 202 includes a minimum engine speed Ne-min and a maximum engine speed Ne-max. The minimum engine speed Ne-min can be an engine idle speed, e.g., 800-1000 RPM, and the maximum engine speed Ne-max can be a maximum achievable engine speed, i.e., redline, which is specific to an engine configuration and can be in the range of 5000 RPM to 8000 RPM. The torque normalization ratio range 204 preferably ranges from 0.0 to 1.0.

The search scheme 200 includes a two-dimensional search engine (search engine) 210 that iteratively generates a plurality of candidate engine speeds Ne(j) 212 across the input speed range 202 and a plurality of candidate torque normalization ratios R(j) 214 across the torque normalization ratio range 204, each which is input to an iteration loop 250. The iteration loop 250 employs a constraints scheme 220, a torque normalization scheme 230, a system torque optimization scheme 235, and a power cost model 240 to calculate a candidate power cost Pcost(j) 242 for each candidate engine speed Ne(j) 212 and each candidate torque normalization ratio R(j) 214. The search engine 210 monitors the candidate power costs Pcost(j) 242 for all iterations. The candidate engine speed Ne(j) 212 that achieves a minimum power cost is selected by the search engine 210 as the preferred engine speed Ne* 252. The preferred engine speed Ne* 252 and corresponding power cost P* 254 are identified based upon execution of a plurality of iteration loops across the input speed range 202 and range of torque normalization ratios 204. In one embodiment the iteration loops across the input speed range 202 encompass input speeds of idle, 1500 RPM, 2000 RPM, 2500 RPM, and 3500 RPM. In one embodiment the plurality of iteration loops 250 across the range of torque normalization ratios 204 encompasses torque normalization ratios of 0.0, 0.3, 0.7, and 1.0.

The search engine 210 iteratively generates the candidate engine speeds Ne(j) 212 from the input speed range 202. Each candidate engine speed Ne(j) 212 is employed in the constraints scheme 220, which determines minimum and maximum permissible engine torques, i.e., Te-min 222 and Te-max 224 based upon the aforementioned torque search space 305 shown with reference to FIG. 3-1. The search engine 210 iteratively generates candidate torque normalization ratios R(j) 214 from the range of torque normalization ratios 204. The torque normalization scheme 230 employs each candidate torque normalization ratio R(j) 214 to determine a candidate engine torque Te(j) 232 by interpolating between the minimum and maximum permissible engine torques Te-min 222 and Te-max 224. One having ordinary skill in the art understands determining a torque value by employing a ratio to interpolate between minimum and maximum torque values.

The system torque optimization scheme 235 employs the candidate engine torque Te(j) 232, an output torque request 206, and powertrain system operating parameters to determine a preferred powertrain operating point 237. The preferred powertrain operating point 237 includes preferred operating parameters for the first and second torque machines 60, 62, e.g., torque and speed, and the battery 85, e.g., battery power and a state of charge, in response to the output torque request 206 when the engine is operating at the candidate engine torque Te(j) 232. The power cost model 240 employs a power cost function to determine a candidate power cost P(j) 242 for operating the powertrain at the preferred powertrain operating point 237 for the candidate engine torque Te(j) 232. An exemplary power cost function 400 is described with reference to FIG. 4.

The search engine 210 selects the preferred engine speed Ne* 252 based upon the power costs for the candidate engine speeds Ne(j) 212. The preferred engine speed Ne* 252 is the candidate engine speed Ne(j) 212 that results in a minimum total power cost for operating the powertrain system 100 under the present conditions. The preferred engine speed Ne* 252 and corresponding power cost P* 254 are employed to control operation of the engine 12, with operation of the powertrain system 10 corresponding thereto.

FIG. 3-1 includes a graph 300 that illustrates the torque search space 305 associated with operating an embodiment of the multi-mode powertrain system 100 in response to an output torque request. The torque search space 305 is circumscribed by minimum and maximum engine torque limits 330 and 340, respectively, that are responsive to the output torque request and subject to a plurality of powertrain system constraints. The graph 300 includes engine torque on the vertical axis 320 plotted relative to engine speed on the horizontal axis 310. As shown, the powertrain system 100 is operating with the transmission 10 in a known operating range, and the engine is in the ON state in an all-cylinder state. A skilled practitioner is able to determine torque search spaces 305 that account for different magnitudes of the various engine and powertrain parameters, the output torque request, and the powertrain system constraints. The powertrain system constraints include minimum and maximum engine torque capabilities 314 and 316, respectively, and maximum engine torque limits for the torque machines 312. Two exemplary engine speed points are shown including 1750 RPM having a first torque range 322, and 4700 RPM having a second torque range 324. The first torque range 322 encompasses engine torque from 220 Nm to 270 Nm, and the second torque range 324 encompasses engine torque from 90 Nm to 105 Nm. The powertrain system constraints that are employed to determine the minimum and maximum engine torque limits 330 and 340, respectively, include minimum and maximum battery power limits associated with the battery 85, and minimum and maximum torque limits associated with the first and second torque machines 60, 62. The minimum and maximum torque limits can be determined relative to the respective speeds of the first and second torque machines 60, 62, which are determined relative to the speeds of the input member 14 and the output member 92. The torque search space 305 can be predetermined for a powertrain system operating point.

FIG. 3-2 graphically shows a normalized torque search space 305', including normalized engine torque on the vertical axis 320' circumscribed by normalized minimum and maximum engine torque limits 330' and 340' plotted relative to engine speed on the horizontal axis 310. The normalized torque search space 305' corresponds to the torque search space 305 shown with reference to FIG. 3-1 with the engine torque on the vertical axis 320 normalized to a range from 0.0 to 1.0 at each of plurality of engine speeds. The normalized engine torque at 0.0 at a selected engine speed corresponds to the minimum engine torque limit 330 shown on FIG. 3-1 and the normalized engine torque at 1.0 at the selected engine speed corresponds to the maximum engine torque limit 340 shown on FIG. 3-1. The first normalized torque range 322' represents the first torque range 322 shown on FIG. 3-1 at an engine speed of 1750 RPM normalized to a range from 0.0 to 1.0 and the second normalized torque range 324' represents the second torque range 324 shown on FIG. 3-1 at an engine speed of 5000 RPM normalized to a range from 0.0 to 1.0.

Figure 4:
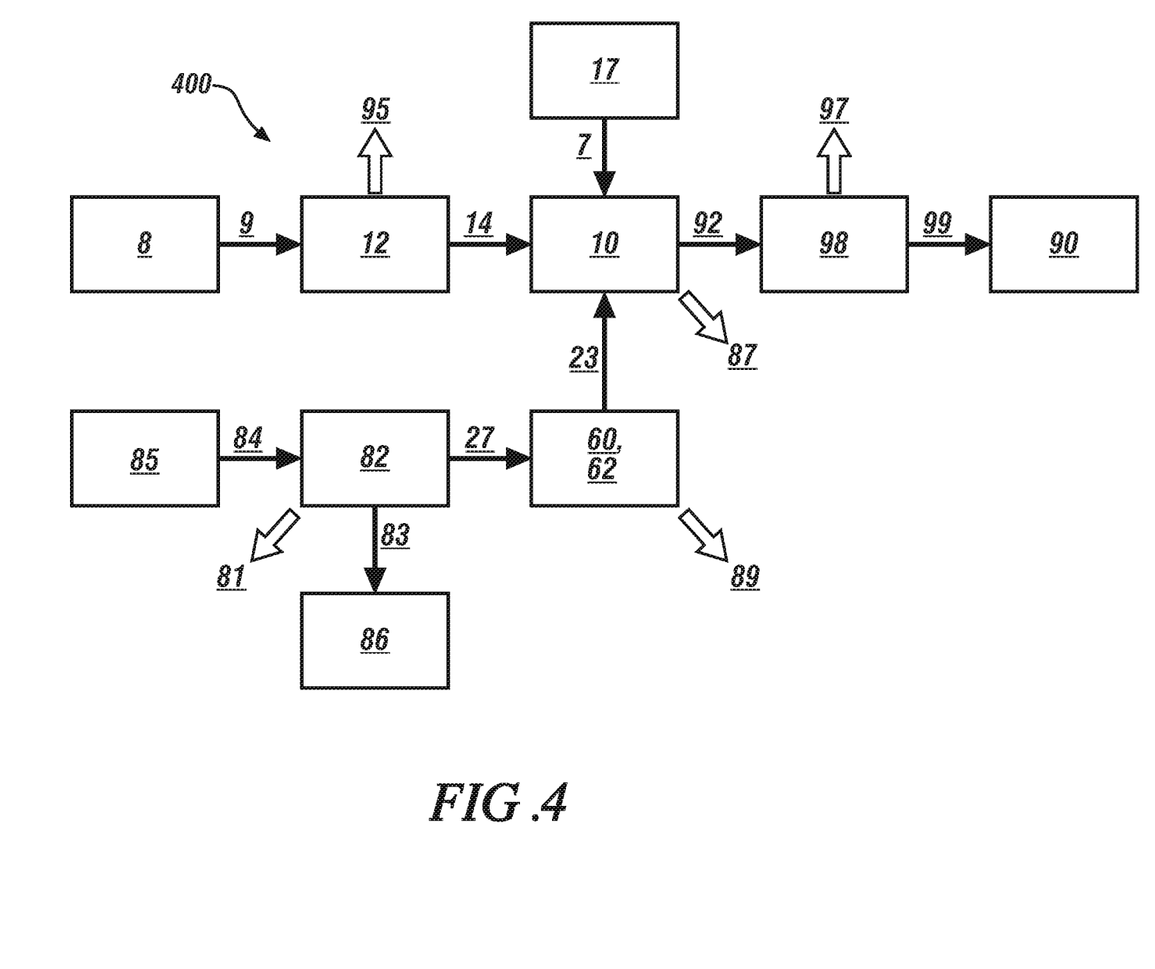
FIG. 4 illustrates an exemplary power cost function including an analytic framework for determining powertrain system operating costs, in accordance with the disclosure.

FIG. 4 schematically illustrates exemplary power cost function 400 including an analytic framework for determining powertrain system operating costs, which is described with reference to the multi-mode powertrain system 100 described with reference to FIG. 1. Powertrain elements include engine 12, transmission 10, non-combustion torque machines 60, 62, battery 85, inverter 82, wheel brakes 98, driveline 90, and a fuel storage system 8. Pseudo-elements include an inertial load 17, which is an element constructed to account for system inertias, and high-voltage electrical load 86, which is an element constructed to account for high-voltage loads in the vehicle outside that load used for propulsion of the powertrain system 100. Power flow paths include a first power flow path 9 from the fuel storage system 8 to transfer fuel power to the engine 12, a second power flow path 14 between the engine 12 and the transmission 10, and third power flow path 84 between the battery 85 and the inverter 82, a fourth power flow path 83 between the inverter 82 and the high-voltage electrical load 86, and fifth power flow path 27 between the inverter 82 and the non-combustion torque machines 60, 62, a sixth power flow path 23 between the non-combustion torque machines 60, 62 and the transmission 10, and seventh power flow path 7 between the inertial load 17 and the transmission 20, an eighth power flow path 92 between the transmission 10 and the wheel brakes 98, and a ninth power flow path 99 between the wheel brakes 98 and the driveline 90. Power losses include engine power losses 95, battery power losses 81, mechanical power losses 87, electric motor losses 89, and brake power losses 97. The power cost inputs to the power cost function 400 are determined based upon factors related to vehicle drivability, fuel economy, emissions, and battery usage. Power costs are assigned and associated with fuel and electrical power consumption and are associated with a specific operating points of the multi-mode powertrain. Lower operating costs can be associated with lower fuel consumption at high conversion efficiencies, lower battery power usage, and lower emissions for each engine speed/load operating point, and take into account the candidate operating state of the engine 14. The power costs may include the engine power losses 95, electric motor power losses 89, battery power losses 81, brake power losses 97, and mechanical power losses 87 associated with operating the multi-mode powertrain at specific operating points for the engine 10 and the non-combustion torque machines 60, 62. The power cost function 400 may be employed to determine a total power cost for operating at a selected engine operating point while operating the powertrain system responsive to an output torque request.

The use of a torque search space and a normalized search range facilitates accurate convergence in an optimization search routine, thus improving search robustness and search efficiency. Furthermore, such operation can reduce quantity of iterations required to converge to a solution, which reduces controller throughput demands and improves resource utilization.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating a powertrain system including a multi-mode transmission configured to transfer torque among an engine, torque machines, and a driveline, the method comprising:
   executing a search to determine a preferred engine operating point for operating the powertrain system in a transmission range in response to an output torque request, said search comprising:
   for each of a plurality of candidate engine speeds within an input speed range and each of a plurality of candidate torque normalization ratios wherein the candidate torque normalization ratios for the candidate engine speed include a normalized engine torque at 0.0 corresponding to a minimum permissible engine torque for the candidate engine speed and a normalized engine torque at 1.0 corresponding to a maximum permissible engine torque for the candidate engine speed:
   employing the candidate torque normalization ratio to determine a candidate engine torque from a normalized torque search space, and
   determining a candidate power cost associated with operating the powertrain system at the candidate engine torque;
   determining a preferred engine speed comprising the candidate engine speed corresponding to the one of the candidate engine torques associated with a minimum of the candidate power costs; and
   controlling engine operation responsive to the preferred engine speed.

2. The method of claim 1, wherein employing the candidate torque normalization ratio to determine the candidate engine torque from the normalized torque search space comprises:
   determining the minimum and maximum permissible engine torques subject to constraints at the candidate engine speed; and
   employing the candidate torque normalization ratio to determine the candidate engine torque based upon said minimum and maximum permissible engine torques.

3. The method of claim 2, wherein determining minimum and maximum permissible engine torques subject to constraints at the candidate engine speed comprises determining the minimum and maximum permissible engine torques subject to minimum and maximum battery power limits associated with a high-voltage battery configured to transfer electric power to the torque machines and subject to minimum and maximum torque limits associated with the torque machines.

4. The method of claim 3, wherein the minimum and maximum torque limits associated with the torque machines are determined relative to speeds of the torque machines determined relative to the candidate engine speed and an output speed of the multi-mode transmission.

5. The method of claim 2, wherein employing the candidate torque normalization ratio to determine the candidate engine torque based upon said minimum and maximum permissible engine torques comprises employing the candidate torque normalization ratio to interpolate between the minimum and maximum permissible engine torques to determine the candidate engine torque.

6. The method of claim 1, wherein determining the candidate power cost associated with operating the powertrain system at the candidate engine torque comprises:
 determining a preferred powertrain operating point in response to the output torque request when the engine is operating at the candidate engine torque; and
 determining the candidate power cost at the preferred powertrain operating point.

7. The method of claim 6, wherein determining the preferred powertrain operating point in response to the output torque request when the engine is operating at the candidate engine torque comprises determining preferred torque commands for the torque machines and determining a preferred battery power for a high-voltage battery coupled to the torque machines in response to the output torque request when the engine is operating at the candidate engine torque.

8. The method of claim 1, wherein controlling engine operation responsive to the preferred engine speed comprises controlling engine operation responsive to the preferred engine speed at the candidate engine torque associated with the minimum of the candidate power costs.

9. A method for controlling an engine in a powertrain system including a multi-mode transmission, the method comprising:
 executing a search to determine a preferred engine operating point in response to an output torque request, said search comprising:
  for each of a plurality of candidate engine speeds within an input speed range and each of a plurality of candidate torque normalization ratios:
   employing the candidate torque normalization ratio to determine a candidate engine torque from a normalized torque search space, and
   determining a candidate power cost associated with operating the powertrain system at the candidate engine torque;
  determining a preferred engine speed comprising the candidate engine speed corresponding to the one of the candidate engine torques associated with a minimum of the candidate power costs; and
 controlling engine operation responsive to the preferred engine speed at the candidate engine torque associated with the minimum candidate power cost;
 wherein the candidate torque normalization ratios for the candidate engine speed include a normalized engine torque equal to 0.0 corresponding to a minimum permissible engine torque for the candidate engine speed and a normalized engine torque equal to 1.0 corresponding to a maximum permissible engine torque for the candidate engine speed.

10. The method of claim 9, wherein employing the candidate torque normalization ratio to determine the candidate engine torque from the normalized torque search space comprises:
 determining the minimum and maximum permissible engine torques subject to constraints at the candidate engine speed, and
 employing the candidate torque normalization ratio to determine the candidate engine torque based upon said minimum and maximum permissible engine torques.

11. The method of claim 10, wherein determining minimum and maximum permissible engine torques subject to constraints at the candidate engine speed comprises determining the minimum and maximum permissible engine torques subject to minimum and maximum battery power limits associated with a high-voltage battery configured to transfer electric power to torque machines coupled to the multi-mode transmission and subject to minimum and maximum torque limits associated with the torque machines.

12. The method of claim 11, wherein the minimum and maximum torque limits associated with the torque machines are determined relative to speeds of the torque machines determined relative to the candidate engine speed and an output speed of the multi-mode transmission.

13. The method of claim 10, wherein employing the candidate torque normalization ratio to determine the candidate engine torque based upon said minimum and maximum permissible engine torques comprises employing the candidate torque normalization ratio to interpolate between the minimum and maximum permissible engine torques to determine the candidate engine torque.

14. The method of claim 9, wherein determining the candidate power cost associated with operating the powertrain system at the candidate engine torque comprises:
 determining a preferred powertrain operating point in response to an output torque request when the engine is operating at the candidate engine torque; and
 determining the candidate power cost at the preferred powertrain operating point.

15. A method for operating a powertrain system including a multi-mode transmission configured to transfer torque among an engine, torque machines, and a driveline, the method comprising:
 executing a search to determine a preferred engine operating point for operating the powertrain system in a transmission range in response to an output torque request, said search comprising:
  determining an input speed range to the transmission;
  for each of a plurality of candidate engine speeds within the input speed range and each of a plurality of candidate torque normalization ratios wherein the candidate torque normalization ratios for the candidate engine speed include a normalized engine torque at 0.0 corresponding to a minimum permissible engine torque for the candidate engine speed and a normalized engine torque at 1.0 corresponding to a maximum permissible engine torque for the candidate engine speed:
   determining the minimum and maximum permissible engine torques subject to constraints associated with the candidate engine speed,
   employing the candidate torque normalization ratio to determine a candidate engine torque based upon said minimum and maximum permissible engine torques, and
   determining a candidate power cost associated with operating the powertrain system at the candidate engine torque;
  determining a preferred engine speed comprising the candidate engine speed corresponding to the one of the candidate engine torques associated with a minimum of the candidate power costs; and
controlling engine operation responsive to the preferred engine speed.

16. The method of claim 15, wherein employing the candidate torque normalization ratio to determine the candidate engine torque based upon said minimum and maximum permissible engine torques comprises employing the candidate torque normalization ratio to interpolate between the minimum and maximum permissible engine torques to determine the candidate engine torque.

17. The method of claim 15, wherein determining the candidate power cost associated with operating the powertrain system at the candidate engine torque comprises:
   determining a preferred powertrain operating point in response to an output torque request when the engine is operating at the candidate engine torque; and
   determining the candidate power cost at the preferred powertrain operating point.

18. The method of claim 17, wherein determining the preferred powertrain operating point in response to the output torque request when the engine is operating at the candidate engine torque comprises determining preferred torque commands for the torque machines and determining a preferred battery power for a high-voltage battery coupled to the torque machines in response to the output torque request when the engine is operating at the candidate engine torque.

* * * * *